United States Patent
Ebata

(10) Patent No.: US 7,515,911 B2
(45) Date of Patent: Apr. 7, 2009

(54) RADIO TRANSMISSION APPARATUS, ROUTING METHOD, AND ROUTING PROGRAM OF RADIO NETWORK

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 1355 days.

(21) Appl. No.: 10/407,187

(22) Filed: Apr. 7, 2003

(65) Prior Publication Data

US 2003/0195005 A1 Oct. 16, 2003

(30) Foreign Application Priority Data

Apr. 12, 2002 (JP) .............................. 2002-111015

(51) Int. Cl.
*H04Q 7/20* (2006.01)
*H04Q 7/24* (2006.01)
*G01R 31/08* (2006.01)

(52) U.S. Cl. ........................ 455/445; 370/238; 370/338

(58) Field of Classification Search ................. 455/445; 370/238, 338
See application file for complete search history.

(56) References Cited

U.S. PATENT DOCUMENTS

| 5,987,011 | A * | 11/1999 | Toh ............................ 370/331 |
| 7,031,336 | B2 * | 4/2006 | Scherzer et al. ............. 370/461 |
| 7,295,844 | B1 * | 11/2007 | Moon et al. .................. 455/445 |
| 2002/0024935 | A1 | 2/2002 | Furukawa et al. | |
| 2003/0179718 | A1 * | 9/2003 | Ebata et al. ................. 370/255 |
| 2004/0157557 | A1 * | 8/2004 | Barnett et al. ............... 455/41.2 |
| 2004/0203820 | A1 * | 10/2004 | Billhartz .................. 455/452.1 |
| 2005/0063340 | A1 * | 3/2005 | Hoffmann et al. ............ 370/332 |
| 2005/0265305 | A1 * | 12/2005 | Furukawa et al. ............ 370/349 |
| 2005/0286426 | A1 * | 12/2005 | Padhye et al. ................ 370/238 |
| 2005/0286458 | A1 * | 12/2005 | Furukawa et al. ............ 370/315 |

FOREIGN PATENT DOCUMENTS

| JP | 2000-115171 | 4/2000 |
| JP | 2001-244983 | 9/2001 |

OTHER PUBLICATIONS

Japanese Office Action dated Mar. 13, 2007, with partial English-language translation.

* cited by examiner

*Primary Examiner*—Fan Tsang
*Assistant Examiner*—Lisa Hashem
(74) *Attorney, Agent, or Firm*—McGinn IP Law Group, PLLC

(57) ABSTRACT

A task is to automatically carry out directional control of an antenna in parallel with routing in a radio network.

In the event that a radio transmission apparatus 100, which is a node configuring the radio network, received a routing packet 200 from the node over the radio network, it acquires and records a received direction of the routing packet 200, an identifier of a transmission source node, metric information indicating a route cost, and an identifier of a route destination node, and in the event that the route destination node is not its own node, the radio transmission apparatus 100 takes control so as to match a direction of an antenna system 101 to the received direction of the node having minimum metric information out of the recorded metric information.

30 Claims, 8 Drawing Sheets

RADIO TRANSMISSION APPARATUS, ROUTING METHOD, AND ROUTING PROGRAM OF RADIO NETWORK

BACKGROUND OF THE INVENTION

The present invention relates to a radio transmission apparatus, and more particular to a radio transmission apparatus for constructing a route of a radio network by employing a directional antenna.

Conventionally, the radio transmission apparatus of this type was employed in the event of configuring the radio network by employing the directional antenna in an inter-base-station network in a mobile communication system (cellular system), and in an ad hoc network for autonomously configuring a network without connection to a wire network.

The routing in the network is composed of the process of grasping a state of the network by exchanging a routing packet by node companions capable of making communication. By the routing packet, the control is taken so that a total route cost for reaching a specific communication destination is recognized, and such a route that the cost becomes minimum is employed.

In the wire network, only node companions connected by means of a cable are capable of making communication; however, in the radio network, there is a status that it is impossible to grasp which node is a node capable of making communication. For this reason, it is necessary to predetermine the route for constructing the network, or to make a scheme in which the network is autonomously constructed in consideration of characteristics of the radio. Inter-base-station communication in the cellular system is made by means of the former technique in many cases, and the ad hoc network corresponds to the latter.

The inter-base-station network in the cellular system is not only configured to employ the wire such as an optical fiber, but also is configured to employ a fixed radio apparatus and the directional antenna in some cases. In a system having such a configuration, the route is designed in advance in installing a base station because of communication between fixed stations, and directivity of the antenna is regulated to the route for the node of a connection destination to fix it. In this case, there is no necessity for causing both of the routing and the directional regulation to act harmoniously for control in the directional regulation of the antenna because a radio station of the connection destination was pre-decided at the time of designing.

On the other hand, the ad hoc network does not require the node such as the base station and a control station, which makes management in a concentrated manner, and terminal companions employ the radio to autonomously configure the network. In such a network, in making communication between specific nodes, the other node, which is positioned between the nodes that make communication, relays the packet in the event that direct communication is impossible due to the problem of the transmission distance.

This example is shown in FIG. 9. The terminal companions tied up by lines in the figure are presumed to be able to communicate with each other by means of a radio link. In the same figure, it is impossible for a terminal A to directly communicate with a terminal D; however communication is possible by relaying the packet via the other node. For example, when the packet is relayed via a terminal B, the packet reaches the terminal D by two-hop transmission. Or, when the packet is relayed via both of a terminal C and a terminal E, its transmission becomes three-hop transmission. In such a manner, communication is possible to make by utilizing the relay by the other node in the ad hoc network; however, the route to a communication partner needs to be established prior to communication whenever it is made, because it is assumed that the position of the terminals varies.

An omnidirectional antenna is employed in many cases in the ad hoc network system, and the routing packet for establishing the route, and a data packet for transmitting data are sent almost in all directions by employing the identical antenna. It is a purposive service method to transmit the packet in all directions by employing the omnidirectional antenna in the packet transmission for establishing the route; however when the omnidirectional antenna is employed for communication of data, radio waves result in being radiated in a direction other than the direction of the terminal to which the packed is desirably sent, whereby interference is apt to occur, which is not effective.

An example of the ad hoc network employing the directional antenna was described in JP-P2001-244983A. In the routing method described in this JP-P2001-244983A, in generating the route, a SINR (signal power to interference noise power ratio) of a signal (pre-determined training pattern) to be sent from surrounding terminals was measured together with received direction information, and its information was employed for the directional control at the time of transmission. After the direction information of the surrounding terminals and information of the SINR were collected, a search for the route up to the communication partner is made.

At this moment, each node have already held a routing table, and recorded the relaying number (hop number) required in the event of communicating with the node of the communication partner, and the node that became a closest route destination. An operation is as follows in the event of searching for the route to the node of the communication partner that does not exist in the above routing table, or to the node of the communication partner of which the entry available period expired already even though it exists.

At first, the terminal recorded in the routing table, which can be reached at one hop from its own node, is asked as to whether direct communication is possible to make with the communication partner desired for communication. Said direction information is employed to regulate the directivity in transmitting the signal for asking the terminal. In the event that communication is impossible to make with any first-hop terminal, next, the routing table is confirmed to ask the terminals that can be reached at two hops. By repeating such an operation in order of the node, beginning with the node that can be reached at one hop, and in order of the SINR, beginning with a large value, the route to the communication partner desired for communication is discovered. This method allows the route, of which the hop number up to the communication destination becomes minimum, and of which the SINR up to the first-hop relay terminal becomes maximum, to be selected.

However, the conventional network system as mentioned above has the problems as described below.

Route generation in the network is made, by employing the routing packet to select the route of which the route cost up to the communication partner becomes minimum. The relaying number (hop number) ranging the node, which initiates communication, up to its destination is often employed for the route cost, however the sum etc. of the inverse number of the SINR of each inter-node radio link is employed in the radio network. So as to carry out such a routing that the route cost is minimized, it is necessary for a certain node to propagate the routing packet in the surrounding nodes. Additionally, on the other hand, at the moment that the route is decided, and data is transmitted by employing this route, it is effective from the viewpoint of interference restrain and a gain to employ the directional antenna to transmit data. Accordingly, in the event of employing the directional antenna to transmit data, a necessity occurs for transmitting a signal in all directions to generate an appropriate route, and for regulating a direction of the directional antenna to the generated route.

It is possible to design the network in advance for deciding the route, as is the case with the conventional base-station network construction; however the node is added and the route is changed in some cases due to increase in the user number, generation of obstacles between the routes, and so forth after initiation of the service. In this case, the network has to be re-designed once again and the directivity of the antenna has to be regulated for the node of which the connection destination is changed, which takes much time and labor.

Also, cooperation between the routing and the directional control is carried out in the ad hoc network employing the directional antenna; however only a measurement value between its own node and the surrounding node is employed in the conventional example (JP-P2001-244983A), whereby, in consideration of efficiency of the entire system, it can not always be said to become a best-suited value. For example, in the network like FIG. 9, now assume that two three-hop routes of terminal A→B→D→F (route 1) and terminal A→C→E→F (route 2) exist for communication from a terminal A to a terminal F. In the event that this two routes were treated as a candidate, as to the SINR between the terminal A and its neighboring node, the SINR between the terminals A and C, which exists at a closer position, is normally larger than that between the terminals A and B; however as to the total SINR of the entire route, the route 1 is larger in some cases because the distance between the terminals E and F is longer, and pass loss becomes larger. At this time, the route 2 is selected in the method of the conventional example because only the SINR up to the neighboring node is confirmed. However the route 1 is selected in the event that the routing packet was employed to select the route. In such a manner, taking a consideration into the entire route ranging the node, which initiates communication, up to the destination node, if only quality for its own node and the neighboring node is taken as a selection criterion, the inadequate route results in being selected in some cases.

Also, in the routing method of the ad hoc network, it is premised that the location of each node is frequently changed, and furthermore, each node decides the route for each destination by itself, whereby its method is unsuitable for the inter-base-station network etc. of the cellular system in which the nodes are arranged in a fixed manner.

Thus, the present invention has been accomplished so as to solve the above-mentioned tasks, and an objective thereof is to provide a radio transmission apparatus, a routing method, and a routing program of the radio network that, in employing the directional antenna to construct the radio network, make it possible to autonomously control the directivity of the antenna in parallel with route generation employing the routing packet.

Furthermore, another objective of the present invention is to provide a radio transmission apparatus, a routing method, and a routing program of the radio network that make it possible to simultaneously carry out the routing of both nodes that are positioned upstream and downstream respectively, and the directional control of the antenna in the radio network.

DISCLOSURE OF THE INVENTION

A first invention for accomplishing the above-mentioned objectivity, which is a radio transmission apparatus that is a node configuring a radio network, is characterized in that, in the event that a routing packet was received from the node over said radio network, a received direction of the above routing packet, an identifier of a transmission source node, metric information indicating a route cost, and an identifier of a route destination node are acquired and recorded, and in the event that the above route destination node is not its own node, control is taken so as to match a direction of an antenna system to said received direction of the node having minimum metric information out of the above recorded metric information.

A second invention for accomplishing the above-mentioned objectivity is characterized in that, in the event that said routing packet was received, the received direction and information associated with a received signal of said routing packet are detected to update and record the metric information indicating the route cost to said transmission source node, based on said detected received direction and information associated with said received signal, and control is taken so as to match the direction of the antenna system to said received direction of the node having minimum metric information out of the above recorded metric information.

A third invention for accomplishing the above-mentioned objectivity, which comprises a routing section for controlling said antenna system, and metric storage section for storing said metric information, is characterized in that, in the event that said routing section received a routing packet, it acquires the identifier of the transmission source node, the metric information indicating the route cost, and the identifier of a route destination node from said routing packet, and in the event that said routing section judged that the above route destination node was not its own node, it employs said received direction and information of said received signal to update said acquired metric information, records it in said metric storage section, acquires the received direction of the node having minimum metric information from said metric storage section, and controls a direction of said antenna system.

A fourth invention for accomplishing the above-mentioned objectivity is characterized in that said metric storage section comprises a table for filing said metric information updated by employing the identifier of the transmission source node, said received direction, and information of the received signal acquired from said routing packet, said node by said node.

A fifth invention for accomplishing the above-mentioned objectivity, which comprises an antenna system for a routing packet, an antenna system for data transmission, a routing section, and a metric storage section, is characterized in that said routing section acquires an identifier of a transmission source node, metric information indicating a route cost, and an identifier of a route destination node from the routing packet received in said antenna system for a routing packet, and in the event that said routing section judged that the above route destination node was not its own node, it employs said received direction and information of said received signal, updates said acquired metric information, records it in said metric storage section, acquires the received direction of the node having minimum metric information from said metric storage section, and controls a direction of said antenna system for data transmission.

A sixth invention for accomplishing the above-mentioned objectivity is characterized in comprising a service antenna storage section for, in controlling the direction for said antenna system for data transmission, recording the identifier of the node recorded responsive to said received direction in said metric storage section, and the identifier of the antenna for which the direction was controlled.

A seventh invention for accomplishing the above-mentioned objectivity is characterized in that, in the event that said routing section received said routing packet, it records the received direction of the received signal of which a receiving state is better, based on information associated with the acquired received signal, in the event that the identifier of the transmission source node and the metric information of the above routing packet have already been recorded in said metric storage section, and the detected received direction is different from the recorded received direction.

An eighth invention for accomplishing the above-mentioned objectivity is characterized in that, in the event that said routing section judged that said metric information recorded in said metric storage section was sufficiently collected, it acquires the received direction of the node having minimum metric information from said metric storage section, and controls the direction of said antenna system for data transmission.

A ninth invention for accomplishing the above-mentioned objectivity is characterized in that an antenna for transmission of said antenna system for a routing packet is configured of an antenna capable of radiating radio waves in all directions, and an antenna for reception thereof is configured of an array antenna or a directional antenna capable of specifying the received direction.

A tenth invention for accomplishing the above-mentioned objectivity is characterized in that, in the event that said routing section received said routing packet, it acquires the received direction of the above routing packet, the identifier of the transmission source node, the metric information indicating the route cost, and the identifier of a route destination node that is a neighboring node of said transmission source node that is positioned upstream the route, and in the event that the identifier of the above route destination node indicates its own node, said routing section takes control so as to match the direction of said antenna system for data transmission to the above received direction.

An eleventh invention for accomplishing the above-mentioned objectivity is characterized in that said routing section records the identifier of the above transmission source node, the above received direction, and the above metric information in a table of the above metric storage section, selects the nodes equivalent to the number of the usable antennas of the antenna system for data transmission from the above table, and takes control so as to match the direction of each antenna of the antenna system for data transmission to the received direction recorded responsive to said selected node.

A twelfth invention for accomplishing the above-mentioned objectivity is characterized in that said routing section records the identifier of said selected node, and the identifier of each antenna of the antenna system for data transmission, which is used for the above selected node, in said service antenna storage section.

A thirteenth invention for accomplishing the above-mentioned objectivity is characterized in that, in the event that said routing section judged that said metric information of said table was sufficiently collected, it selects the nodes equivalent to the number of the usable antennas from said table.

A fourteenth invention for accomplishing the above-mentioned objectivity is characterized in that said routing section generates a routing table for specifying the route for a route destination of its own node from the identifier of a route destination node, and the identifier or the direction of the antenna stored in said service antenna storage section for a neighboring node, which is transmitted for communicating with the above route destination node.

A fifteenth invention for accomplishing the above-mentioned objectivity is a routing method in a node configuring a radio network, wherein, in the event that a routing packet was received from the node over said radio network, a received direction of the above routing packet, an identifier of a transmission source node, metric information indicating a route cost, and an identifier of a route destination node are acquired and recorded, and in the event that the above route destination node is not its own node, control is taken so as to match a direction of the antenna system to said received direction of the node having minimum metric information out of the above recorded metric information.

A sixteenth invention for accomplishing the above-mentioned objectivity is a routing method in a node configuring a radio network, wherein, in the event that said routing packet was received, the received direction and information associated with a received signal of said routing packet are detected, and the metric information indicating the route cost to said transmission source node is updated and recorded, based on said received direction and information associated with said received signal, and control is taken so as to match the direction of the antenna system to said received direction of the node having minimum metric information out of the above recorded metric information.

A seventeenth invention for accomplishing the above-mentioned objectivity is a routing method in a node configuring a radio network, wherein the identifier of the transmission source node, the metric information indicating the route cost, and the identifier of a route destination node are acquired from the routing packet received in an antenna system for a routing packet, in the event that it was judged that the above route destination node was not its own node, said received direction and information of said received signal are employed to update said acquired metric information, and to record it in a metric storage section, and the received direction of the node having minimum metric information is acquired from said metric storage section to control the direction of an antenna system for data transmission.

An eighteenth invention for accomplishing the above-mentioned objectivity is a routing method in a node configuring a radio network, wherein, in the event that said routing packet was received, the received direction of the above routing packet, the identifier of the transmission source node, the metric information indicating the route cost, and the identifier of a route destination node, which is a neighboring node of said transmission source node that is positioned upstream the route, are acquired, and in the event that the identifier of the above route destination node indicates its own node, control is taken so as to match the direction of the antenna system for data transmission to the above received direction.

A nineteenth invention for accomplishing the above-mentioned objectivity, which is a routing program for executing a routing in a node configuring a radio network, has the functions of: in the event of having received a routing packet from the node over said radio network, acquiring and recording a received direction of the above routing packet, an identifier of a transmission source node, metric information indicating a route cost, and an identifier of a route destination node; and in the event that the above route destination node is not its own node, taking control so as to match the direction of the antenna system to said received direction of the node having minimum metric information out of the above recorded metric information.

A twentieth invention for accomplishing the above-mentioned objectivity has a function of, in the event of having received said routing packet, detecting the received direction, and information associated with a received signal of said routing packet to update and record the metric information indicating the route cost to said transmission source node, based on said received direction and information associated with said received signal, and taking control so as to match the direction of the antenna system to said received direction of the node having minimum metric information out of the above recorded metric information.

A twenty-first invention for accomplishing the above-mentioned objectivity has a function of acquiring the identifier of the transmission source node, the metric information indicating the route cost, and the identifier of the route destination node from the routing packet received in an antenna system for a routing packet, and in the event that it was judged that the above route destination node was not its own node, employing said received direction and information of said received signal to update said acquired metric information, to record it in a metric storage section, to acquire the received direction of the node having minimum metric information from said metric storage section, and to control the direction of the antenna system for data transmission.

A twenty-second invention for accomplishing the above-mentioned objectivity has a function of, in controlling the direction for said antenna system for data transmission, recording the identifier of the node recorded responsive to said received direction in said metric storage section, and the identifier of an antenna, for which the direction was controlled, in a service antenna storage section.

A twenty-third invention for accomplishing the above-mentioned objectivity has a function of, in the event of having received said routing packet, recording the received direction of the received signal, of which a receiving state is better, based on information associated with the acquired received signal in the event that the identifier of the transmission source node and the metric information of the above routing packet have already been recorded in said metric storage section, and the detected received direction is different from the recorded received direction.

A twenty-fourth invention for accomplishing the above-mentioned objectivity has a function of, in the event that it was judged that said metric information recorded in said metric storage section was sufficiently collected, acquiring the received direction of the node having minimum metric information from said metric storage section to control the direction of said antenna system for data transmission.

A twenty-fifth invention for accomplishing the above-mentioned objectivity has a function of, in the event of having received said routing packet, acquiring the received direction of the above routing packet, the identifier of the transmission source node, the metric information indicating the route cost, and the identifier of a route destination node that is a neighboring node of said transmission source node that is positioned upstream the route, and in the event that the identifier of the above route destination node indicates its own node, taking control so as to match the direction of said antenna system for data transmission to the above received direction.

A twenty-sixth invention for accomplishing the above-mentioned objectivity has a function of recording the identifier of the above transmission source node, the above received direction, and the above metric information in a table of the above metric storage section to select the nodes equivalent to the number of the usable antennas of the antenna system for data transmission from the above table, and to take control so as to match the direction of each antenna of the antenna system for data transmission to the received direction recorded responsive to the above selected node.

A twenty-seventh invention for accomplishing the above-mentioned objectivity has a function of recording the identifier of said selected node, and the identifier of each antenna of the antenna system for data transmission to be used for the above selected node in said service antenna storage section.

A twenty-eighth invention for accomplishing the above-mentioned objectivity has a function of, in the event that it was judged that said metric information of said table was sufficiently collected, selecting the nodes equivalent to the number of the usable antennas from said table.

A twenty-ninth invention for accomplishing the above-mentioned objectivity has a function of generating a routing table for specifying the route for a route destination of its own node from the identifier of the route destination node, and the identifier or the direction of the antenna stored in said service antenna storage section for a neighboring node, which is transmitted for communicating with the above route destination node.

In the present invention, which is configured as mentioned above, by causing the directional control and the routing to act harmoniously for processing in generating the route of radio communication, information of the routing packet can be utilized to carry out the routing in consideration of efficiency of the entire network system, and it becomes possible to match the direction of the directional antenna to the route for regulation.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Hereinafter, the embodiments of the present invention will be explained in detail by referring to the accompanied drawings.

At first, a system environment for which the present invention is applied will be explained. The present invention is particularly employed for an application in which an inter-base-station radio network in a cellular system is automatically established.

In realizing the cellular system that is processed at a high speed, and has a large capacity, scale-down of cells is one of typical methods; however the number of the base station to be used is increased, being accompanied by the scale-down of the cells. For this reason, the network between the base stations also becomes increased/complicated, and it takes much cost and time to construct the network by means of the wire.

So as to remove this problem, there is a method of constructing the inter-base-station network by means of the radio. Also, so as to form this inter-base-station network inexpensively and speedily, an existing radio technology, for example, a radio LAN to be specified by IEEE802.11a/b can be employed. Since these radio LAN appliances are a general-purpose product that generally prevails, the apparatus cost is inexpensive, and also the cost and the procedure time etc. for keeping the frequency are not required because a frequency band for which no license is needed is used.

Figure 8:
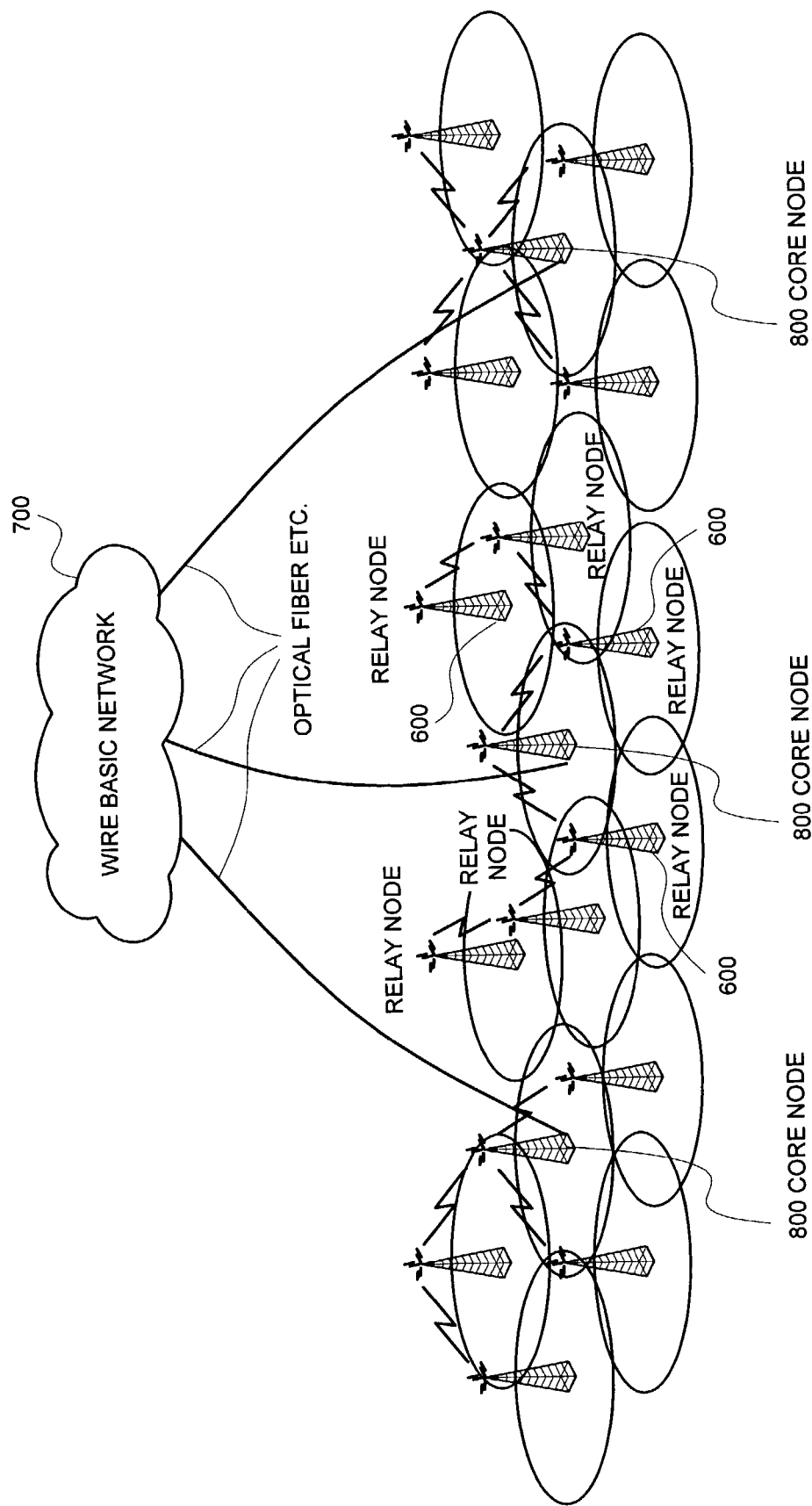
FIG. 8 is a view illustrating an example of an inter-base-station radio network for which the present invention is applied.
Figure 9:
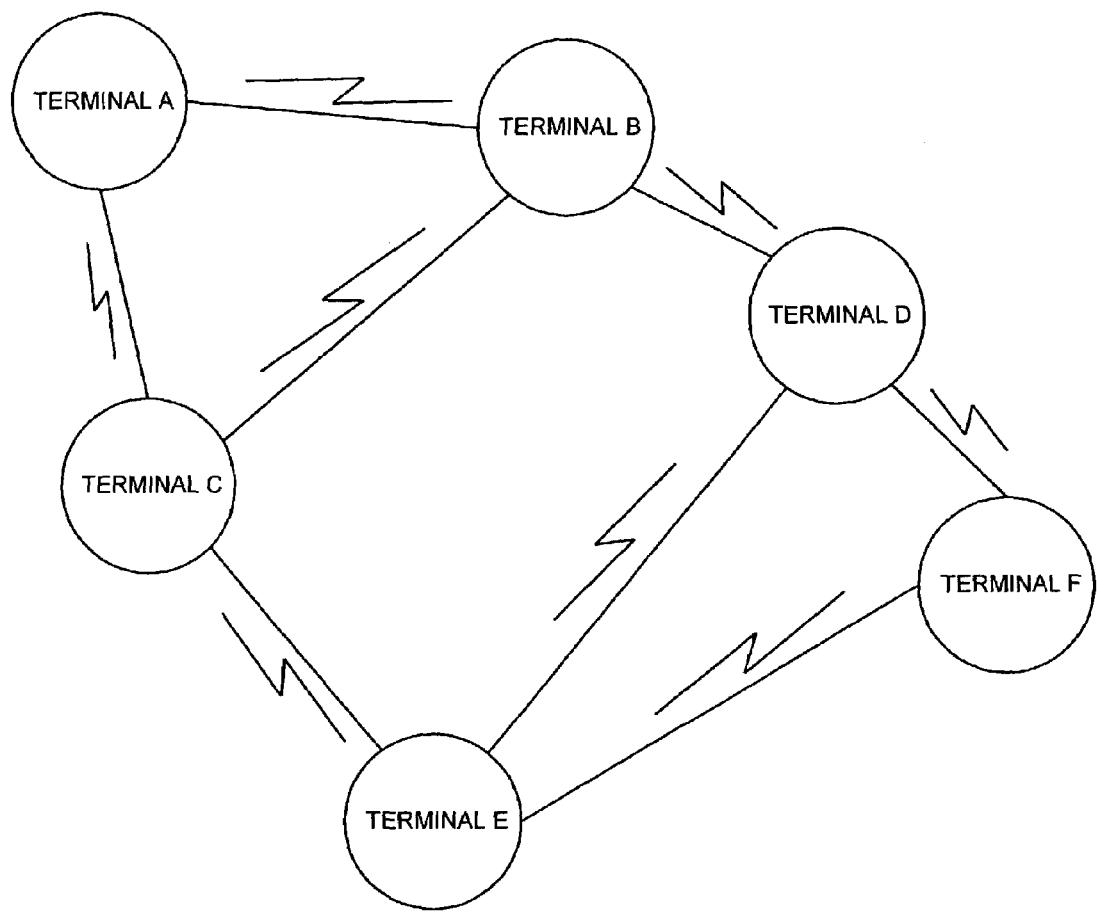
FIG. 9 is a view illustrating an example of an ad hoc network.

FIG. 8 illustrates an example of the inter-base-station radio network, wherein is shown the status that the route was formed ranging from a base station (hereinafter, referred to as a core node) 800 connected to a wire basic network 700 by employing an optical fiber etc. to the other base station (hereinafter, referred to as a relay node) 600 by employing a radio link. The core node 800 and the relay node 600, which offer to mobile terminals an access service in areas as indicated by ellipses in the figure respectively, construct the radio network between the base stations so as to enable communication between the wire basic network 700 and the mobile terminal.

The routing in such a radio network configuration is aimed for generating the route from each relay node 600 up to the core node 800, and the route with a tree structure having the core node 800 as a crest (root) is generated. For this end, each node notifies the other node of the route cost up to the core node 800, and employs a range-vector type routing of finding the route of which the route cost becomes minimum.

In taking the actual routing, at first the core node 800 transmits the routing packet. The surrounding relay node 600 that received its routing packet modifies contents thereof, and transmits the routing packet again, and the routing packet prevails in the entire area where the nodes exist, by repeating this.

The identifier of the node (refereed to as an upstream node) established by each node, which became a route on the core node 800 side, and a total route cost (referred to as metric information) for reaching the core node 800 are included in the routing packet, and when a different routing packet is received from a different node, the node of which the route cost is smaller is selected as the route. Accordingly, various routes are generated in a forming process of the route; however they converge as the time elapses, and the route is finally formed of which the route cost (metric information) from each node up to the core node 800 becomes minimum.

The present invention relates to a decision method of a route destination node (node that neighbors on the upstream side in the route to be generated), and a process method of the routing packet at each node in the event that the directional antenna was applied for each node in the radio network for which the routing method as mentioned above is applied.

That is, the present invention has been accomplished for the purpose of simultaneously carrying out the routing and the directional control, by recording information for the directional control as well at the moment that the radio transmission apparatus as the relay node 600 employs the routing packet to autonomously decide the route in the radio network as described above. The upstream node (route destination node), which is a neighboring node on a near side to the core node, and a downstream node, which is a neighboring node on a far side, exist at a certain relay node in the route to be generated by employing the routing, and its two kinds of the up-and-down routes result in being generated. These two kinds can be judged by contents of the routing packet. Since the route becomes tree-structure shaped with the core node as a crest, the upstream node is always one (1) for a certain relay node.

Figure 1:
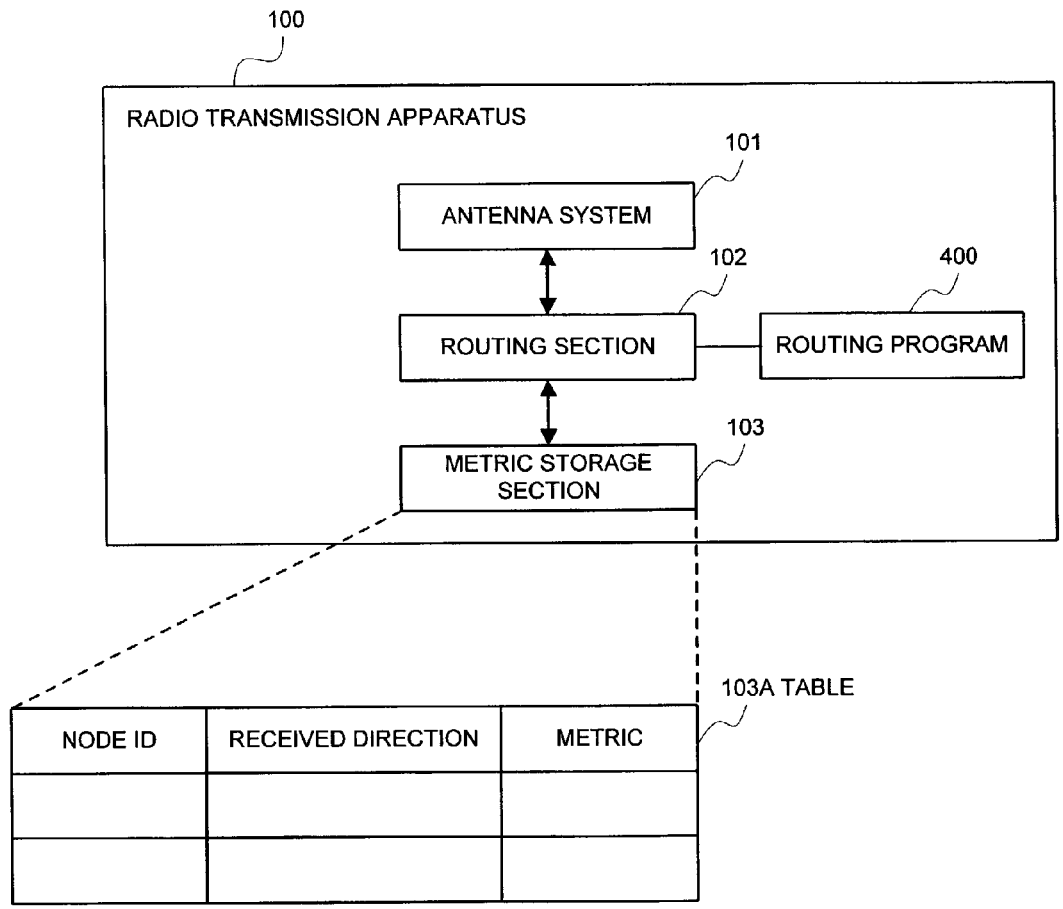
FIG. 1 is a block diagram illustrating a configuration of a radio transmission apparatus in accordance with a first embodiment of the present invention.

Referring to FIG. 1, a radio transmission apparatus 100 in accordance with a first embodiment of the present invention comprises an antenna system 101, a routing section 102, and a metric storage section 103. Additionally, only a characteristic configuration of this embodiment was described in FIG. 1, and description on the other general configuration was omitted. Hereinafter, each component will be explained, and an operation will be explained thereafter.

Figure 2:
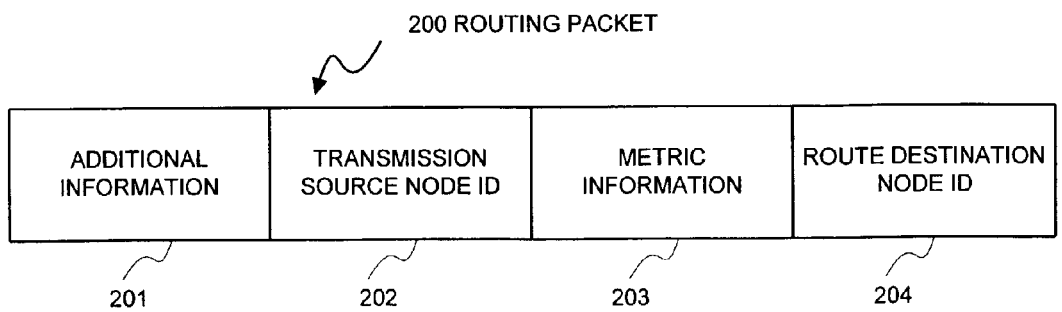
FIG. 2 is a view for explaining an example of a routing packet in accordance with the first embodiment of the present invention.

The antenna system 101 is an antenna system capable of transmitting/receiving the packet. When the antenna system 101 receives a routing packet 200, it can acquire the received direction of the routing packet 200. Furthermore, the antenna system 101 can measure the received signal, and acquire information associated with the received signal information, for example, the received level and the SINR. Additionally, the routing packet 200 is configured of, for example, as shown in FIG. 2, additional information 201, a transmission source node ID 202, metric information 203, and a route destination node ID 204.

The transmission source node ID 202 indicates the identifier of the transmission source node of the routing packet 200. The metric information 203 indicates the route cost that is information that becomes a criterion at the moment of deciding the route. The route destination node ID 204 indicates the identifier of the neighboring node that neighbors on the upstream side of the transmission source node of the routing packet 200. The additional information 201 is the other information.

The routing section 102 has a function of fetching information from the routing packet 200 to process it, and to record it in the metric storage section 103, and acquiring specific information from information recorded in the metric storage section 103 to notify the antenna system 101 of its information.

The metric storage section 103 retains the identifier of the node (node ID), the received direction that corresponds hereto, and metric information that are included in the routing packet 200, as shown in a table 103A. Herein, so-called metric information indicates the cost of the route. That is, the smaller this value, the smaller the route cost, which means that the efficient route is possible to generate.

Figure 3:
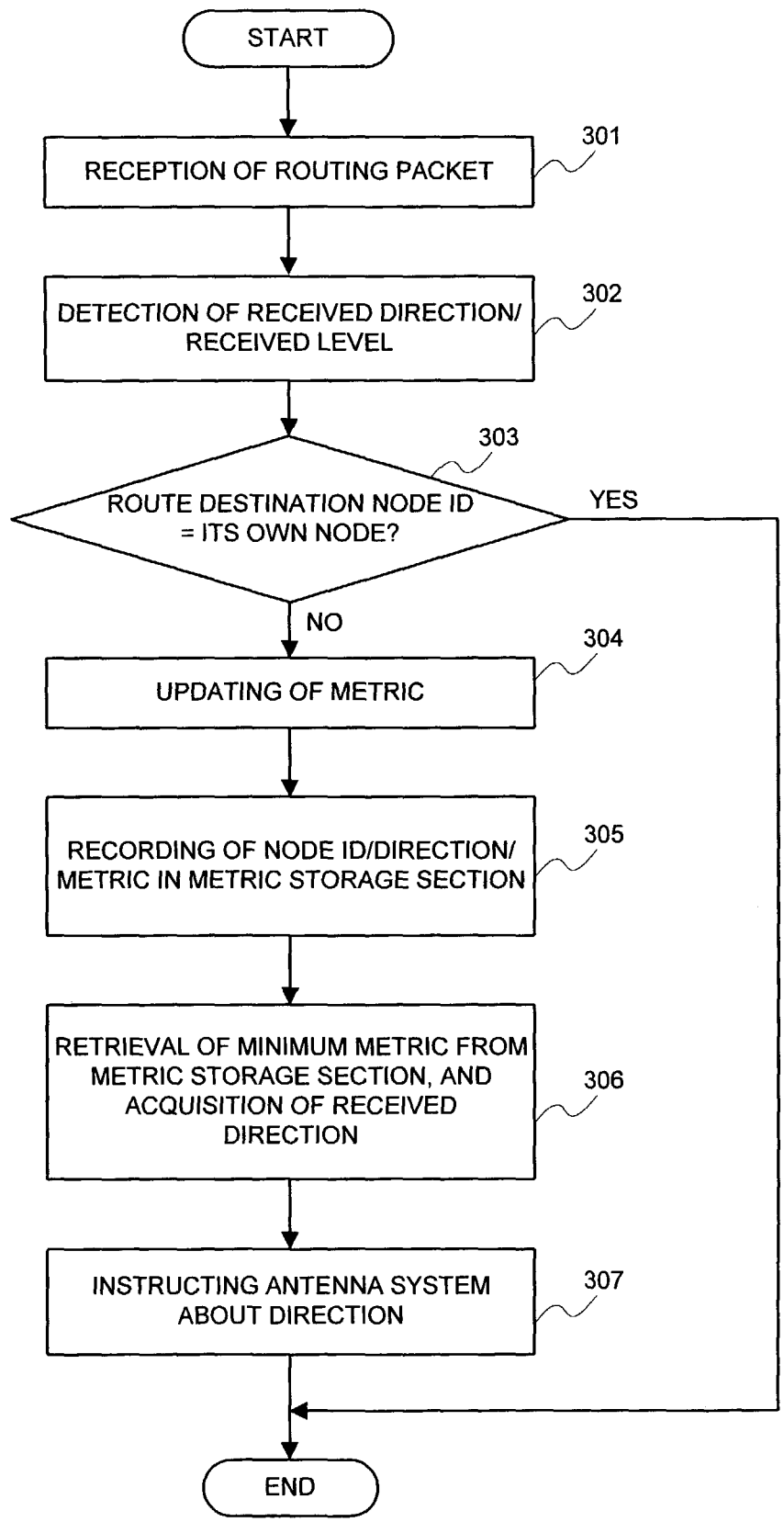
FIG. 3 is a flowchart for explaining an operation of the radio transmission apparatus in accordance with the first embodiment of the present invention.

Next, the operation of this embodiment will be explained by referring to a flowchart of FIG. 3. This operation is an operation that the radio transmission apparatus 100 of this embodiment decides the node that becomes the upstream node in the route, and gives instruction so as to match the directivity of the antenna to the direction of this node. The decision of the downstream node and the antenna regulation are not carried out in this embodiment.

The routing packet 200 is received in the antenna system 101 (step 301). When the antenna system 101 receives the routing packet 200, it specifies the received direction, acquires information associated with the received signal (step 302), and supplies it together with the above routing packet 200 to the routing section 102.

The routing section 102, to which the routing packet 200 was supplied, confirms the route destination node ID 204 to determine whether or not the route destination node ID 204 indicates its own node (step 303).

As a result of the determination, in the event that the route destination node ID indicated its own node, the process is finished in this embodiment. This is because that the route destination node is its own node means that the transmission source node of the above routing packet is a candidate for the upstream node of its own node. On the other hand, in the event that the route destination node ID 204 did not indicate its own node, this means that the above transmission source node is a candidate for the upstream node of its own node, whereby the subsequent process is performed.

In the event that the route destination node ID 204 did not indicate its own node, the routing section 102 fetches metric information, based on contents of the routing packet 200, to update it (step 304). Updating of the metric information is carried out by adding to the metric information 203 recorded within the routing packet 200 the route cost from the transmission source node up to its own node of the above routing packet. The route cost from the transmission source node up to its own node can be acquired by utilizing information associated with the received signal that the antenna system 101 acquired.

The routing section 102 records the updated metric information, the transmission source node ID 202 acquired from the routing packet 200, and the received direction of the above routing packet 200 notified from the antenna system 101 in a table 103A of the metric storage section 103 (step 305).

And, the routing section 102 retrieves an entry having minimum metric information within the table 103A recorded in the metric storage section 103, acquires the received direction recorded for its minimum metric information (step 306), and instructs the antenna system 101 about the direction of the antenna, based on its received direction (step 307).

By performing the operation as described above, the directional control of the antenna is made possible in parallel to the routing. The efficient route for which consideration was taken into the entire network can be selected because of the routing utilizing the routing packet 200, and the directional control can be automatically carried out by simultaneously recording the metric information that becomes a criterion of the routing, and the received direction of the routing packet.

Next, a radio transmission apparatus 100A in accordance with a second embodiment of the present invention will be explained.

Figure 4:
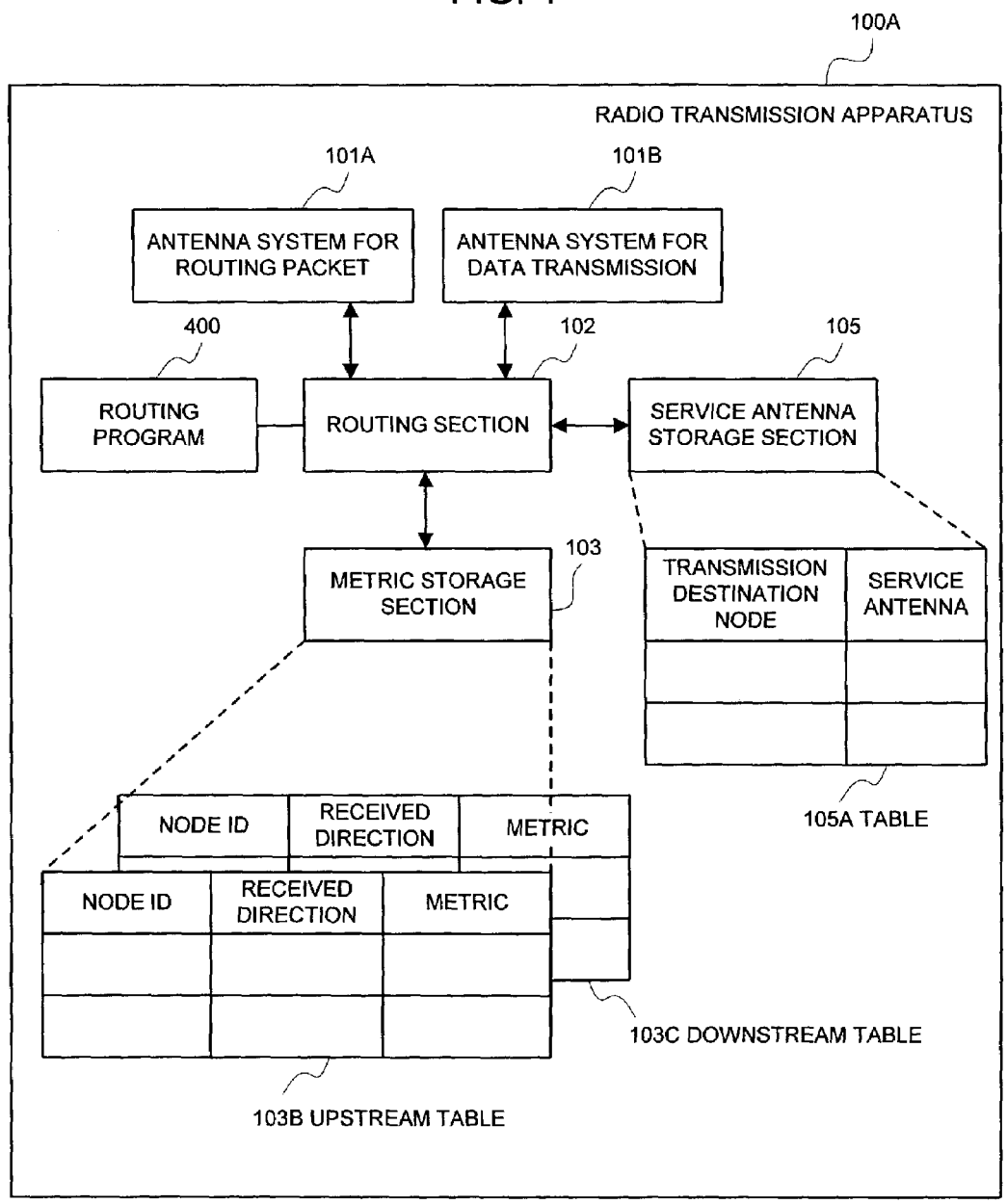
FIG. 4 is a block diagram illustrating the configuration of the radio transmission apparatus in accordance with a second embodiment of the present invention.

Referring to FIG. 4, the radio transmission apparatus 100A in accordance with this embodiment comprises an antenna system for a routing packet 101A, an antenna system for data transmission 101B, the routing section 102, the metric storage section 103, and a service antenna storage section 105. Additionally, only a characteristic configuration of this embodiment was described in FIG. 4, and the description on the other general configuration was omitted. At first, each component will be explained, and thereafter an operation will be explained in detail.

The antenna system for a routing packet 101A is an antenna system that can make transmission/reception in all directions, and yet can specify the arrival direction of the signal, which was received, to measure information associated with the received signal such as a received signal level. As long as this function can be attained, there is no limitation to a specific configuration. As a specific example having such a function, for example, a configuration is listed, in which the directional antenna such as an array antenna and a horn antenna is rotated.

Also, the antenna system for a routing packet 101A separately comprises an antenna for transmission and an antenna for reception. In consideration of the fact that it is desirable to widely notify the surrounding nodes of transmission/reception of the routing packet 200, it is also possible to employ the omnidirectional antenna such as a dipole antenna for the antenna for transmission, and to employ only for the antenna for reception such a configuration that the array antenna and the directional antenna capable of forming the directivity are rotated. In particular, in the event of employing the technology of the radio LAN (for example, IEEE802.11 Specification) as a transmission technique, the directional antenna having a high gain is impossible to use for the antenna for transmission when transmission power is specified because an EIRP (Effective Isotropic Radiated Power) has already been restricted. When the antenna system for a routing packet 101A receives the routing packet, it supplies it to the routing section 102.

The routing section 102 processes the routing packet 200 to be supplied from the antenna system for a routing packet 101A, and records information in the metric storage section 103. Also, the routing section 102 decides a connection destination node appropriate as the route, based on the information (table) recorded in the metric storage section 103, and gives instruction so as to match the direction of the antenna system for data transmission 101B to the above node.

The metric storage section 103 has two kinds of tables for the upstream and the downstream of the route (upstream table 103B, and downstream table 103C), and as shown in FIG. 4, each table preserves the node identifier (ID), the received direction of the routing packet, and the metric information for the routing. In the event that the antenna system for a routing packet 101A is configured so as to rotate the directional antenna, the signal of the same node is received in a different direction in some cases; however in this moment the direction of the received signal of which a receiving state is best is recorded, based on information of the received signal.

The antenna system for data transmission 101B is configured of the directional antenna to be employed for making data transmission after the route was decided, and for example, the array antenna and the horn antenna are employed. However, it is justified that either antenna for transmission or antenna for reception is the omnidirectional antenna such as the dipole antenna. This is because the antenna having a high gain is impossible to employ for transmission in the event of employing the radio LAN etc. for which the EIRP was specified as mentioned above.

Also, the direction of the antenna system for data transmission 101B is regulated by the instruction from the routing section 102. However so as to more precisely regulate the directivity, after the directional control that accompanied the routing was completed, fine regulation can be made so that the received level from the partner station becomes maximum. Additionally, the antenna system for data transmission 101B assumes a method of regulating the direction to the direction specified from the routing section 102 to exclusively use one antenna for a certain node, and a method of regulating the direction node by node. In the event of employing the former method to employ a limited number of the antennas, the number of the routes that can be generated is restricted by the number of the antennas.

The service antenna storage section 105 files a table 150A having the identifier of the node established as the route, and the identifier of the antenna to be used recorded correspondingly. Furthermore, the service antenna storage section 105 is employed for indicating the antenna that should be used in transmitting data. Additionally, in the event of employing the array antenna etc. to vary the directivity one after another depending upon the node of the route destination, information to be recorded in the table 105A of the service antenna storage section 105 is not the identifier of the antenna, but the direction of the route destination node.

Also, by utilizing this service antenna storage section 105 at the time of preparing a routing table for recording the next route destination node (node established as the route) node by node, the routing table for recording the service antenna (or the direction) for the destination node can be also prepared. That is, the routing table for specifying the route for the route destination of its own node is generated from the identifier of the route destination node, and the identifier (or the direction) of the antenna recorded in the service antenna storage section 105 for the neighboring node, which is transmitted for communicating with the route destination node. Preparation of such a routing table enables the high-speed routing because the process in routing the packet is simplified.

Next, the operation of a second embodiment will be explained by referring to flowcharts of FIG. 5 and FIG. 6.

When the routing packet 200 is received in the antenna system for a routing packet 101A (step 501), the antenna system for a routing packet 101A acquires information associated with detection of its received direction and the received signal (step 502), and supplies the above routing packet 200 together with its information to the routing section 102. Additionally, the configuration of the routing packet 200 is the same as that explained already in FIG. 2.

The routing section 102, to which the routing packet 200 was supplied, confirms the route destination node ID 204 of the routing packet 200 to determine whether or not the route destination node ID 204 indicates its own node (step 503). In the event that the route destination node ID 204 is its own ID, it can be judged that the transmission source node of the above routing packet 200 selected its own node as an upstream route destination. That is, it is seen that the transmission source node of the above packet is a candidate for the downstream node of its own node in the route.

In the event that the route destination node ID 204 indicates its own node, the routing section 102 gives instruction to the antenna system for data transmission 101B so as to regulate the directivity of the antenna to the received direction supplied from the antenna system for a routing packet 101A (step 504), and simultaneously therewith, the routing section 102 records the transmission source node of the above routing packet as the route destination node in the service antenna storage section 105, and records the service antenna for which the direction was regulated (step 505). And, the process is finished, and the operation waits for the next routing packet.

Additionally, it is also possible that the antenna system for data transmission 101B is configured of one antenna, and the direction is varied one after another responding to the route destination node, and in this case, the direction is recorded in a column of the service antenna of the service antenna storage section 105. Also, in the event that the antenna system for data transmission 101B requires one antenna for one route destination node, and has only a limited number of the antennas, when the antenna direction is established for all routing packets 200 from the downstream nodes, in some cases the antenna number is insufficient. Normally, the number of the antenna usable for the downstream nodes is the number obtained by subtracting one (1), which is for the upstream node, from the number of all antennas. This is because a certain relay node needs to be inevitably connected to one upstream node.

Figure 7:
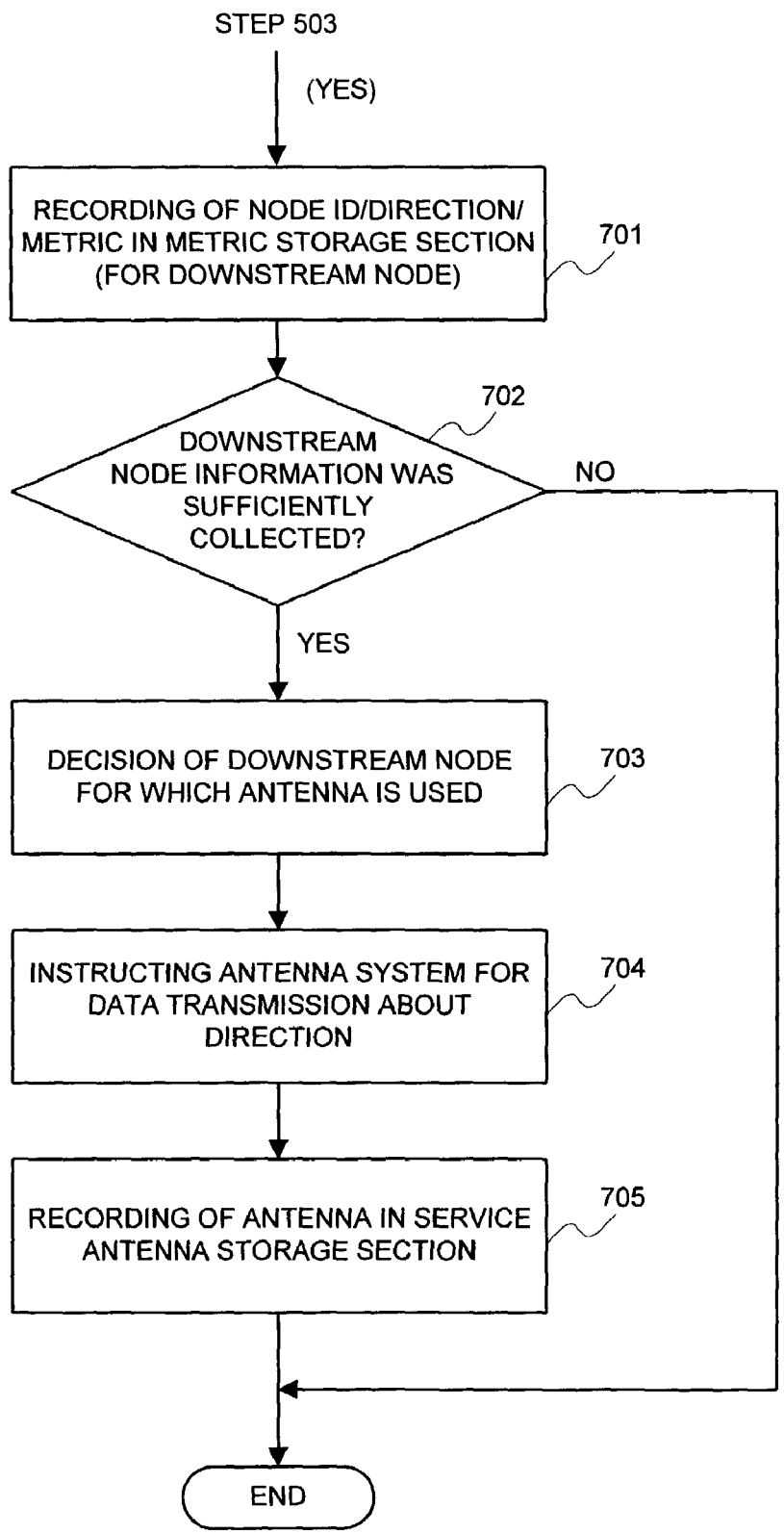
FIG. 7 is a flowchart for explaining process contents in the event of selecting a downstream node to use a limited number of antennas in the second embodiment of the present invention.

Process contents in the event of selecting the downstream node to use a limited number of the antennas in such a circumstance will be explained according to a flowchart of FIG. 7. In the event that the reply to the inquiry was YES in the step 503 of FIG. 5, in a step 701 of FIG. 7, the transmission source node ID of the above routing packet, the received direction, and the metric information are recorded in the downstream table 103C of the metric storage section 103. What has to be cared here is that, in the event of the routing packet 200 from the downstream node, the metric information is not updated, which is different from that of the routing packet 200 from the upstream node to be described later (after step 506 of FIG. 5). This is because the metric information in the node to be selected as the downstream node is used as a selection criterion.

Next, it is judged whether the metric information that was information of the downstream node was sufficiently collected (step 702). As to this judgment criterion, the criterion of whether a predetermined time, which was decided in advance, elapsed, or the same routing packet 200 was received predetermined times, or the like can be employed. In the event of taking the elapse of the predetermined time as a collection judgment criterion of the downstream node information, this indicates an operational time initiated with reception of the routing packet 200 as a turning point; however, assuming that the criterion was met, the operation after the step 703 is also possible to perform without employing a timing at which the routing packet was received.

If collection of the metric information of the downstream node is not sufficient yet, the process is finished, and the operation waits for reception of a new routing packet. Additionally, the operation may proceed to a step 703 to be described later from the step 701 without making such a judgment in the step 702.

If it is judged that the metric information of the downstream node was sufficiently collected, the downstream nodes are selected as many as the usable antennas exist (step 703). As a selection criterion at this moment, order of size of the metric information beginning with small one and order of reception etc. are listed.

When the downstream node to be connected is decided, the received direction of the antenna recorded in the downstream table 103C of the metric storage section 103 is fetched to instruct the antenna system for data transmission 101B as the direction (step 704). And, by taking the node that became the downstream node as the route destination node, the service antenna is recorded in the service antenna storage section 105 (step 705). In such a manner, the directional control is taken for forming the route from its own node to the downstream node.

Figure 5:
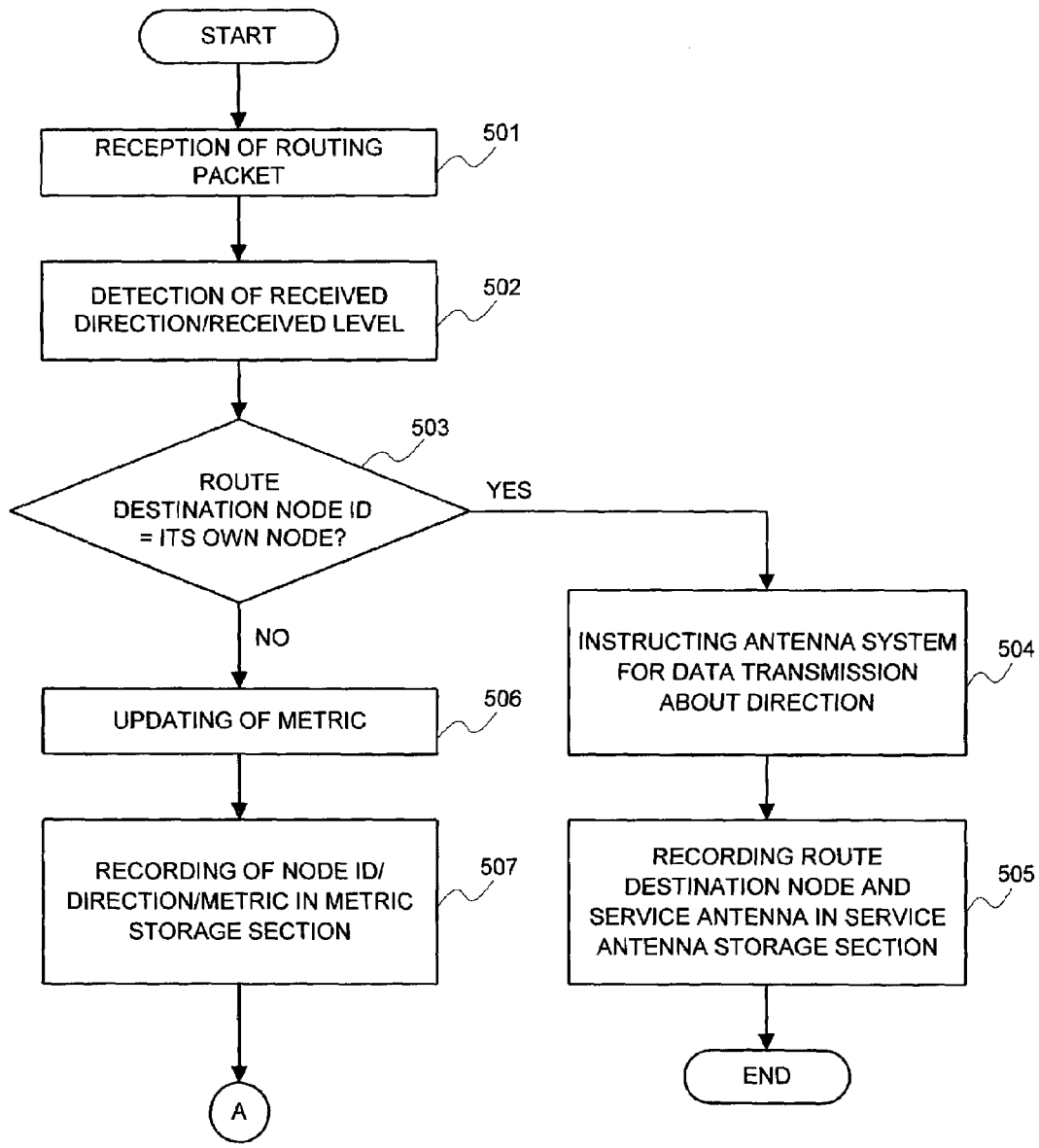
FIG. 5 is a flowchart for explaining the operation of the radio transmission apparatus in accordance with the second embodiment of the present invention.

In the step 503 of FIG. 5, in the event that the route destination node of the routing packet 200 is not its own node, there is the possibility that the transmission source node of the above packet becomes an upstream-side node in the route of its own node. The routing section 102, to which the routing packet 200 was supplied, fetches the transmission source node ID 202 and the metric information 203 from the routing packet 200, and employs the above metric information, and information associated with the received signal supplied from the antenna system for a routing packet 101A to update the metric information (step 506). The hop number, the SINR, the pass loss, etc. are employed as the metric information, for example, in the event of the hop number, one (1) is always added for updating, and in the event of the SINR and the pass loss, a value calculated from information associated with the measured received signal is added for updating.

The routing section 102 records the transmission source node ID, the received direction supplied from the antenna system for a routing packet 101A, and the updated metric information in the upstream table 103B of the metric storage section 103 (step 507). In this moment, in the event that the same node ID was already recorded in the metric storage section 103, it is also possible to record the node ID of which a receiving state is better, judging from information associated with the received signal thereof. Also, it is also possible to establish a time stamp for information recorded in the metric storage section 103 to cancel information that became outdated. Additionally, the routing packet 200 from the downstream node mentioned before, and the above-mentioned routing packet 200 (from a candidate for the upstream node) are independently to be recorded in respective different upstream table 103B and downstream table 103C of the metric storage section 103.

The metric information to be recorded in the metric storage section 103, which indicates not only information between its own node and the surrounding node, but also the total route cost from the core node up to its own node, can be said to be information reflecting a status of the entire network, whereby the more efficient route is possible to form.

The operation is performed as mentioned above, thereby the metric information, which is routing information, is collected from the nodes that exist in the surroundings to generate the table of the metric storage section 103.

Figure 6:
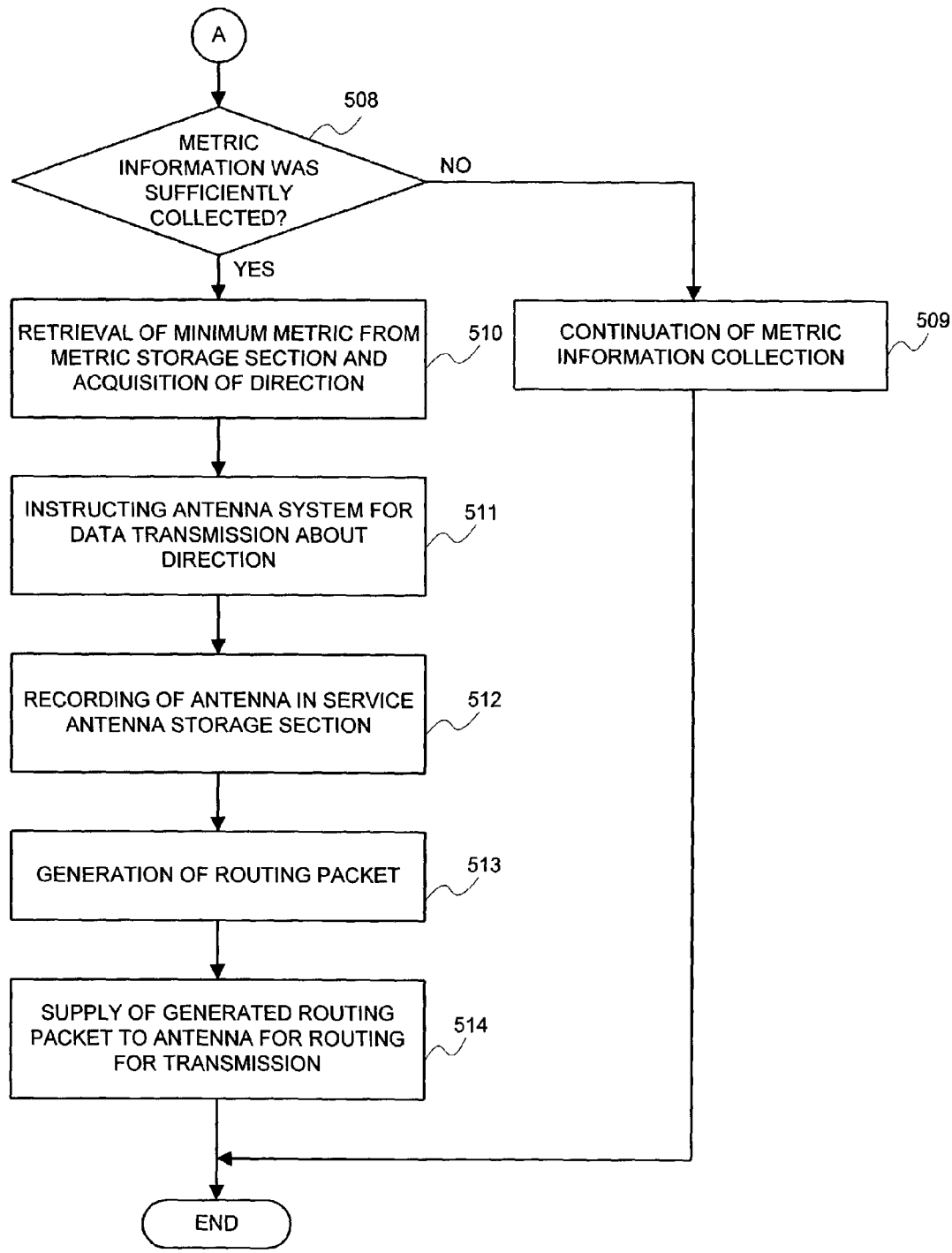
FIG. 6 is a flowchart for explaining the operation of the radio transmission apparatus in accordance with the second embodiment of the present invention.

Next, it is judged whether the metric information was sufficiently collected (step 508 of FIG. 6). As explained in the step 702, the criterion of whether a predetermined time elapsed, or the pass control packet was received predetermined times from the same node, or the like is employed as a criterion of this judgment. Or, the criterion of whether the metric information was sufficiently collected is not employed, but it is also possible that the reply to the step 508 is taken as YES whenever the routing packet 200 is received and new metric information is obtained.

When it is judged that sufficient metric information was collected, the routing section 102 retrieves the upstream table 103B of the metric storage section 103 to select the node of which the metric information becomes minimum, and extracts the direction recorded responsive to the above node (step 510). In the event that the metric information is not sufficient yet, collection of the metric information is continued (step 509).

Next, the routing section 102 gives instruction to the antenna system for data transmission 101B so as to match the directivity to the direction acquired in the step 510 (step 511), and records the selected node and the antenna to be used in the service antenna storage section 105 (step 512).

Additionally, it is also possible that the antenna system for data transmission 101B is configured of one antenna, and the direction is varied responding to the route destination node, and in this case, the selected node and the direction decided by the metric information are recorded in the service antenna storage section 105.

Furthermore, so as to notify the surrounding nodes that the route was decided, the routing packet is generated (step 513). In each field of the routing packet, the identifier of its own node is established as the transmission source node ID, the identifier of the upstream-side node selected as the route is established as the route destination node ID, and the metric information for the route destination node recorded in the metric storage section is established as the metric information. When the routing packet is generated, it is supplied to the antenna system for a routing packet 101A for transmission (step 514). Additionally, in the event that the route destination node extracted in the step 510 is not different from the node of the route destination previously established, the routing packet may not be transmitted.

By employing the above-mentioned second embodiment, in the radio network employing the directional antenna, it is possible to simultaneously carry out the routing of both the upstream node and the downstream node, and the directional control. In this embodiment, by utilizing the metric information to be included within the routing packet, the route, of which the route cost up to the communication destination becomes minimum, is possible to select, and simultaneously, its utilization is for regulating the direction of the directional antenna for data transmission, based on the above metric information and mapping information of the received direction of the routing packet.

In the above-mentioned configuration, the routing section 102 of the radio transmission apparatus can be realized by a computer processing unit (consisting of a CPU and the other internal memories) to be controlled by a computer program, and the function of the routing section 102 can be realized by loading a routing program 400, which is a computer program, into the memory of the computer processing unit for execution. This routing program 400 is filed in a magnetic disc, a semi-conductor memory, and the other record mediums, and is loaded into the computer processing unit from its record medium to control the operation of the computer processing unit, thereby allowing the foregoing function to be realized.

Above, the present invention was explained by listing the preferred embodiments; however the present invention is not always limited to the above-mentioned embodiments, accordingly modifications may be made without departing from the scope of its technical philosophy.

As explained above, in accordance with the present invention, it becomes possible to autonomously take the directional control of the antenna in parallel to the routing of the radio network. That is, by recording the metric information that is information of the route cost generated, based on information to be included in the routing packet to be employed for generation of the route together with the direction in which the routing packet was received, the efficient route for which consideration was taken into the entire network can be selected, and simultaneously therewith, the direction of the antenna can be decided.

Also, such an autonomous control allows the effect to be realized that a preliminary network design and a complicated installation work of the base station can be simplified.

Also, the autonomous control makes it possible to simultaneously carry out the routing of both nodes that are positioned upstream and downstream respectively, and the directional control of the antenna in the radio network. That is, by utilizing the metric information to be included within the routing packet, the route, of which the route cost up to the communication destination becomes minimum, is possible to select, and simultaneously, its utilization is for regulating the direction of the antenna for data transmission, based on the above metric information, and information of the received direction of the routing packet.

The entire disclosure of Japanese Patent Application NO. 2002-111015 filed on Apr. 12, 2002 including specification, claims, drawing and summary are incorporated herein by reference in its entirety.

What is claimed is:

1. A radio transmission apparatus that comprises a node configuring a radio network, said radio transmission apparatus including:
an antenna system for receiving a routing packet from the node over said radio network to acquire a received direction of said routing packet; and
a routing section for acquiring an identifier of a transmission source node, metric information indicating a route cost to said transmission source node, and an identifier of a route destination node from the routing packet that said antenna system received and recording said identifiers, said metric information, and said received direction of said routing packet in a storage section, and in an event that said route destination node is not the node of said radio transmission apparatus, matching a direction of said antenna system to said received direction of the node by judging whether sufficient metric information was collected from said metric information.

2. The radio transmission apparatus according to claim 1, wherein, when said antenna system receives said routing packet from the node over said radio network, the antenna system detects the received direction and information associated with a received signal of said routing packet, and
wherein said routing section updates said metric information, based on said detected received direction and information associated with said received signal.

3. The radio transmission apparatus according to claim 1, wherein, when said antenna system receives said routing packet from the node over said radio network, the antenna system detects the received direction and a received level of said routing packet, and
wherein said routing section updates said metric information, based on said detected received direction and received level.

4. A radio transmission apparatus that comprises a node configuring a radio network, said radio transmission apparatus including:
an antenna system for receiving a routing packet and information of a received signal from the node over said radio network to acquire a received direction of said routing packet; and
a routing section for, in an event that said antenna system received the routing packet, acquiring an identifier of a transmission source node, metric information indicating a route cost, and an identifier of a route destination node from said routing packet, and in an event that it is judged that said route destination node is not said node of said radio transmission apparatus, updating said metric information, based on said received direction and information of said received signal, to record said identifiers, said metric information, and said received direction of said routing packet in a storage section in a metric storage section, matching a direction of said antenna system to the received direction of the node by judging whether sufficient metric information was collected from said metric information, and to control the direction of said antenna system.

5. The radio transmission apparatus according to claim 4, wherein said metric storage section comprises a table for filing said metric information updated by employing the identifier of the transmission source node, said received direction, and information of the received signal acquired from said routing packet by said node.

6. A radio transmission apparatus that comprises a node configuring a radio network, said radio transmission apparatus comprising an antenna system for a routing packet, an antenna system for data transmission, a routing section, and a metric storage section,
wherein said antenna system for a routing packet receives a routing packet, and acquires a received direction and information of a received signal of said routing packet, and
wherein said routing section acquires an identifier of a transmission source node, metric information indicating a route cost, and an identifier of a route destination node from said routing packet, and in an event that said routing section judged that said route destination node is not said node of said radio transmission apparatus, the routing section employs said received direction and information of said received signal, updates said acquired metric information, records said identifiers, said metric information, and said received direction of said routing packet in a storage section in said metric storage section, matching a direction of said antenna system to a received direction of a node by judging whether sufficient metric information was collected from said metric information, and controls the direction of said antenna system for data transmission.

7. The radio transmission apparatus according to claim 6, said radio transmission apparatus comprising a service antenna storage section for, in controlling the direction for said antenna system for data transmission, recording the identifier of the node recorded responsive to said received direction in said metric storage section, and the identifier of the antenna fin which the direction was controlled.

8. The radio transmission apparatus according to claim 7, wherein said routing section generates a routing table for specifying a route for a route destination of the node of said radio transmission apparatus from the identifier of a route destination node, and the identifier or the direction of the antenna stored in said service antenna storage section for a neighboring node, which is transmitted for communicating with said route destination node.

9. The radio transmission apparatus according to claim 6, wherein, in an event that said routing section received said routing packet, the routing section records the received direction of the received signal of which a receiving state is better, based on information associated with the acquired received signal, in an event that the identifier of the transmission source node and the metric information of said routing packet have already been recorded in said metric storage section, and the detected received direction is different from the recorded received direction.

10. The radio transmission apparatus according to claim 6, wherein, in an event that said routing section judged that said metric information recorded in said metric storage section was sufficiently collected, the routing section acquires the received direction of the node having minimum metric information from said metric storage section, and controls the direction of said antenna system for data transmission.

11. The radio transmission apparatus according to claim 6, wherein an antenna for transmission of said antenna system for a routing packet is configured of an antenna capable of radiating radio waves in all directions, and an antenna for reception thereof is configured of an array antenna or a directional antenna capable of specifying the received direction.

12. The radio transmission apparatus according to claim 6, wherein, in an event that said routing section received said routing packet, the routing section acquires the received direction of the said routing packet, the identifier of a transmission source node, the metric information indicating the route cost, and the identifier of a route destination node that is a neighboring node of said transmission source node that is positioned upstream the route, and in an event that the identifier of said route destination node indicates the node of said radio transmission apparatus, said routing section takes control so as to match the direction of said antenna system for data transmission to said received direction.

13. The radio transmission apparatus according to claim 12, wherein said routing section records the identifier of said transmission source node, said received direction, and said metric information in a table of said metric storage section, selects nodes equivalent to a number of usable antennas of the antenna system for data transmission from said table, and takes control so as to match a direction of each antenna of the antenna system for data transmission to the received direction recorded responsive to said selected nodes.

14. The radio transmission apparatus according to claim 13, wherein said routing section records identifiers of said selected nodes, and the identifier of each antenna of the antenna system for data transmission, which is used for said selected nodes, in said service antenna storage section.

15. The radio transmission apparatus according to claim 12, wherein, in an event that said routing section judged that said metric information of a table was sufficiently collected, the routing section selects nodes equivalent to a number of usable antennas from said table.

16. A routing method in a node configuring a radio network, said routing method including:
  in an event of having received a routing packet from the node over said radio network, acquiring and recording a received direction of said routing packet, an identifier of a transmission source node, metric information indicating a route cost, and an identifier of a route destination node;
  recording said identifiers, said metric information, and said received direction of said routing packet in a metric storage section; and
  in an event that said route destination node is not the node configuring said radio network, matching a direction of an antenna system to said received direction of the node by judging whether sufficient metric information was collected from said metric information.

17. The routing method according to claim 16, further including:
  in an event of having received said routing packet, detecting a received direction and information associated with a received signal of said routing packet; and
  updating and recording the metric information indicating the route cost to said transmission source node, based on said received direction and information associated with said received signal, and matching a direction of an antenna system to said received direction of the node by judging whether sufficient metric information was collected from said metric information.

18. The routing method according to claim 16, further including:
  acquiring the identifier of the transmission source node, the metric information indicating the route cost, and the identifier of a route destination node from the routing packet received in an antenna system for a routing packet;
  in the event that it was judged that said route destination node was not the configuring said radio network node, employing said received direction and information of said received signal to update said metric information; and
  matching the direction of an antenna system to the received direction of the node by judging whether sufficient metric information was collected from said metric information to control the direction of the antenna system for data transmission.

19. The routing method according to claim 16, further including:
  in an event of having received said routing packet, acquiring the received direction of said routing packets the identifier of the transmission source node, the metric information indicating the route cost, and the identifier of a route destination node that is a neighboring node of said transmission source node that is positioned upstream the route; and
  in an event that the identifier of said route destination node indicates the node configuring said radio network, taking control so as to match the direction of an antenna system for data transmission to said received direction.

20. A computer program product tangibly embodying a routing program for executing a routing in a node configuring a radio network, said routing program including:
  in an event of having received a routing packet from the node over said radio network, acquiring and recording a received direction of said routing packet, an identifier of a transmission source node, metric information indicating a route cost, and an identifier of a route destination node;
  recording said identifiers, said metric information, and said received direction of said routing packet in a storage section; and
  in an event that said route destination node is not the node configuring said radio network, matching a direction of an antenna system to said received direction of the node by judging whether sufficient metric information was collected from said metric information.

21. The computer program product tangibly embodying a routing program according to claim 20, said routing program further including, in the event of having received said routing packet, detecting a received direction and information associated with a received signal of said routing packet to update and record the metric information indicating the route cost to said transmission source node, based on said received direction and information associated with said received signal, and taking control so as to match the direction of the antenna system to said received direction of the node by judging whether sufficient metric information was collected from said metric information.

22. The computer program product tangibly embodying a routing program according to claim 21, said routing program further including, in the event of having received said routing packet, acquiring the received direction of said routing packet the identifier of the transmission source node, the metric information indicating the route cost, and the identifier of a route destination node that is a neighboring node of said transmission source node that is positioned upstream the route, and in an event that the identifier of said route destination node indicates the node configuring said radio network, taking control so as to match the direction of said antenna system for data transmission to said received direction.

23. The computer program product tangibly embodying a routing program according to claim 22, said routing program further including recording the identifier of said transmission source node, said received direction, and said metric information in a table of said metric storage section to select nodes equivalent to numbers of usable antennas of the antenna system for data transmission from said table, and matching a direction of each antenna of the antenna system for data transmission to the received direction recorded responsive to said selected nodes.

24. The computer program product tangibly embodying a routing program according to claim 23, said routing program further including recording the identifier of said selected node; and the identifier of each antenna of the antenna system for data transmission to be used for said selected nodes in a service antenna storage section.

25. The routing program according to claim 22, said routing program further including, in an event that it was judged that said metric information of a table was sufficiently collected, selecting nodes equivalent to numbers of usable antennas from said table.

26. The computer program product tangibly embodying a routing program according to claim 25, said routing program further including generating a routing table for specifying the route for a route destination of the node configuring said radio network from the identifier of the route destination node, and the identifier or the direction of the antenna stored in a service antenna storage section for a neighboring node, which is transmitted for communicating with said route destination node.

27. The computer program product tangibly embodying a routing program according to claim 20, said routing program further including acquiring the identifier of the transmission source node, the metric information indicating the route cost, and the identifier of a route destination node from the routing packet received in an antenna system for a routing packet, and in the event that it is judged that said route destination node was not the node configuring said radio network, employing said received direction and information of said received signal to update said acquired metric information of the to match the direction of said antenna system to said received direction of the node by judging whether sufficient metric information was collected from said metric information, and to control the direction of the antenna system for data transmission.

28. The computer program product tangibly embodying a routing program according to claim 27, said routing program further including, in controlling the direction for said antenna system for data transmission, recording the identifier of the node recorded responsive to said received direction in said metric storage section, and the identifier of an antenna, for which the direction was controlled, in a service antenna storage section.

29. The computer program product tangibly embodying a routing program according to claim 27, said routing program further including, in an event of having received said routing packet, recording the received direction of the received signal of which a receiving state is better, based on information associated with the acquired received signal in an event that the identifier of the transmission source node and the metric information of said routing packet have already been recorded in said metric storage section and a detected received direction is different from the recorded received direction.

30. The computer program product tangibly embodying a routing program according to claim 27, said routing program further including, in an event that it is judged that said metric information recorded in said metric storage section was sufficiently collected, matching the direction of said antenna system to said received direction of the node by judging whether sufficient metric information was collected from said metric information to control the direction of said antenna system for data transmission.

* * * * *